(12) United States Patent
Lindoff et al.

(10) Patent No.: US 10,349,447 B2
(45) Date of Patent: Jul. 9, 2019

(54) RANDOM ACCESS CHANNEL CONFIGURATION

(71) Applicant: Telefonaktiebolaget L M Ericsson (publ), Stockholm (SE)

(72) Inventors: Bengt Lindoff, Bjärred (SE); Nadia Brahmi, Hildesheim (DE); Erik Eriksson, Linköping (SE); Martin Hessler, Linköping (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 15/517,607

(22) PCT Filed: Oct. 8, 2014

(86) PCT No.: PCT/EP2014/071545
§ 371 (c)(1),
(2) Date: Apr. 7, 2017

(87) PCT Pub. No.: WO2016/055103
PCT Pub. Date: Apr. 14, 2016

(65) Prior Publication Data
US 2017/0257891 A1 Sep. 7, 2017

(51) Int. Cl.
*H04W 4/70* (2018.01)
*H04W 56/00* (2009.01)
(Continued)

(52) U.S. Cl.
CPC ... *H04W 74/0833* (2013.01); *H04W 56/0045* (2013.01); *H04W 74/006* (2013.01); *H04W 4/70* (2018.02)

(58) Field of Classification Search
CPC .... H04W 56/004–0095; H04W 74/0833–0858
See application file for complete search history.

(56) References Cited

U.S. PATENT DOCUMENTS

2004/0198345 A1 10/2004 Farber et al.
2007/0165567 A1 7/2007 Tan et al.
(Continued)

FOREIGN PATENT DOCUMENTS

GB 2509070 A 6/2014
WO 2012031389 A1 3/2012
(Continued)

OTHER PUBLICATIONS

Chang, Chung-Ju et al., "GGRA: A Feasible Resource Allocation Scheme by Optimization Technique for IEEE 802.16 Uplink Systems", IEEE Transactions on Vehicular Technology, vol. 59, Issue 3, Jan. 12, 2010, 1-6.
(Continued)

*Primary Examiner* — Eric Myers
(74) *Attorney, Agent, or Firm* — Murphy, Bilak & Homiller, PLLC

(57) ABSTRACT

A method of a network node of a wireless communication system is disclosed. The method comprises configuring a first random access channel for transmission of random access messages from wireless communication devices having a first synchronization accuracy vis-à-vis the network node and a second random access channel for transmission of random access messages from wireless communication devices having a second synchronization accuracy vis-à-vis the network node, wherein the second synchronization accuracy is lower than the first synchronization accuracy. The method also comprises transmitting configuration information of at least the second random access channel configurations to one of the wireless communication devices. Corresponding method for a wireless communication device is also disclosed along with a computer program product, a network node, a wireless communication device and arrangements there for.

18 Claims, 3 Drawing Sheets

(51) Int. Cl.
    *H04W 74/00*    (2009.01)
    *H04W 74/08*    (2009.01)

(56) References Cited

U.S. PATENT DOCUMENTS

| | | |
|---|---|---|
| 2007/0291696 A1 | 12/2007 | Zhang et al. |
| 2010/0329283 A1 | 12/2010 | Luo et al. |
| 2011/0158206 A1 | 6/2011 | Shrestha et al. |
| 2012/0099543 A1 | 4/2012 | Yang et al. |
| 2013/0034079 A1 | 2/2013 | Takano |
| 2013/0044657 A1 | 2/2013 | Oh et al. |
| 2013/0272119 A1 | 10/2013 | Jang et al. |
| 2014/0098761 A1 | 4/2014 | Lee et al. |
| 2014/0241272 A1 | 8/2014 | Griot et al. |
| 2017/0171875 A1* | 6/2017 | Zakrzewski ............ H04W 4/70 |

FOREIGN PATENT DOCUMENTS

| | | |
|---|---|---|
| WO | 2013044497 A1 | 4/2013 |
| WO | 2014053152 A1 | 4/2014 |

OTHER PUBLICATIONS

Kwon, Taesoo et al., "Multi-Group Random Access Resource Allocation for M2M Devices in Multicell Systems", IEEE Communications Letters, vol. 16, No. 6, Jun. 2012, 834-837.

Lien, Shao-Yu et al., "Toward Ubiquitous Massive Accesses in 3GPP Machine-to-Machine Communications", IEEE Communications Magazine, vol. 49, Issue 4, Apr. 2011, 66-74.

* cited by examiner

RANDOM ACCESS CHANNEL CONFIGURATION

TECHNICAL FIELD

The present invention relates generally to the field of configuration of radio resources for wireless transmission. More particularly, it relates to configuration of radio resources for random access transmissions.

BACKGROUND

In a typical wireless communication system, a wireless communication device associated with the system and wishing to communicate through the system needs to transmit a random access (RA) message (or similar) to the system, thereby requesting radio resources for communication.

In some systems, the random access message itself may be able to carry some data (apart from the random access request) from the wireless communication device and may, thus, be used to convey smaller amount of data without a connection having to be set up.

The random access message should typically be transmitted over a random access channel (RACH) defined in association with the wireless communication system. To be able to correctly use the random access channel, a wireless communication device is required to have a certain time and/or frequency synchronization accuracy vis-à-vis the system (e.g. a network node of the system).

In a typical example, synchronization in time needs to be achieved at symbol level (order of microseconds) and synchronization in frequency needs to be achieved at a level of 0.1 ppm (200 Hz for the case of a 2 GHz carrier). Synchronization is typically achieved by having the wireless communication device listen to the downlink from a network node at regular time intervals (order of seconds) even when the wireless communication is not actively connected to the system.

In emerging wireless communication concepts (e.g. the $5^{th}$ generation cellular communication standard advocated by the Third Generation Partnership Project—3GPP), one application considers support of reliable ultra-low delay machine-type communication (MTC), a.k.a. Critical-MTC. The Critical-MTC concept may need to address design trade-offs regarding e.g., end-to-end latency, transmission reliability, system capacity and deployment. According to some scenarios, the Critical-MTC system should provide for radio resource management that allows coexistence between different classes of applications, for example, applications with sporadic data requiring ultra-low latency (e.g., alert messages) along with applications with real-time periodic data requiring normal latency and/or applications with data under best-effort requirements.

Alert messages (e.g. alarms) represent one potentially important type of messages that may benefit from the Critical-MTC application. Alarms are typically rare events. Hence, the wireless communication device (e.g. a sensor) transmitting the alarm may be of a type associated with low power and/or low cost. Typically, such a type of wireless communication device may not be actively connected or synchronized to the network node continuously. For example, it may be battery driven with a requirement that the battery should last for a long period of time (order of years) and such a requirement may be impossible to fulfill (due to the associated power consumption) if repeatedly listening to the downlink for synchronization. Thus, when an alarm occurs, the wireless communication device first needs to acquire the appropriate synchronization before it may transmit the alarm using the random access channel, which may substantially delay the transmission more than required by the ultra-low delay criterion of Critical-MTC.

Therefore, there is a need for random access approaches with low latency which can be used by a wireless communication device with low power requirements.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and devices of a random access approach with low latency which can be used by a wireless communication device with low power requirements.

According to a first aspect, this is achieved by a method of a network node of a wireless communication system.

The method comprises configuring a first random access channel for transmission of random access messages from a first wireless communication device having a first synchronization accuracy vis-à-vis the network node and configuring a second random access channel for transmission of random access messages from a second wireless communication device having a second synchronization accuracy vis-à-vis the network node, wherein the second synchronization accuracy is lower than the first synchronization accuracy.

The method also comprises transmitting configuration information of at least the second random access channel configurations to the first wireless communication device and to the second wireless communication device.

The first and second synchronization accuracy may, for example, be in respect of synchronization in time, synchronization in frequency, or synchronization in time and frequency.

The first wireless communication device and the second wireless communication device may be the same wireless communication device or may be different wireless communication devices.

The same first random access channel may be configured for one wireless communication device only or for several wireless communication devices. Similarly, the same second random access channel may be configured for one wireless communication device only or for several wireless communication devices.

According to some embodiments, the method may further comprise transmitting configuration information of the first random access channel to the first wireless communication device and to the second wireless communication device.

The first and second random access channels may typically comprise one or more radio resources to be used for transmission of random access messages.

In some embodiments, the second random access channel may comprise a frequency resource dedicated specifically to the second random access channel.

In some embodiments, the second random access channel may comprise a frequency resource shared with other communication of the wireless communication system.

In some embodiments, the second random access channel may further comprise a spreading code dedicated specifically to the second random access channel.

According to some embodiments, the method may further comprise monitoring the second random access channel, and (if a random access message transmitted from the second wireless communication device is detected on the second random access channel) determining a synchronization error of the second wireless communication device and transmitting a random access response to the second wireless communication device, wherein the transmission is compensated based on the determined synchronization error.

The synchronization error may, for example, comprise one or more of a frequency error and a timing error.

A second aspect is a method of a wireless communication device wherein a first random access channel is for transmission of random access messages from the wireless communication device when it has a first synchronization accuracy vis-à-vis the network node and a second random access channel is for transmission of random access messages from the wireless communication device when it has a second synchronization accuracy vis-à-vis the network node. The second synchronization accuracy is lower than the first synchronization accuracy.

The method comprises receiving configuration information of at least the second random access channel from a network node of a wireless communication system.

According to some embodiments, the method may further comprise receiving configuration information of the first random access channel from the network node.

The method may, according to some embodiments, further comprise (when a random access message is to be transmitted due to pending data) determining whether or not the pending data is to be transmitted under requirements that are associated with the second random access channel.

If it is determined that the pending data is to be transmitted under requirements that are associated with the second random access channel, the method may further comprise transmitting the random access message to the network node on the second random access channel.

If it is determined that the pending data is not to be transmitted under requirements that are associated with the second random access channel, the method may further comprise transmitting the random access message to the network node on the first random access channel.

The requirements may, for example, comprise one or more of:
The data needing to be transmitted with a latency that is lower than a system standard latency.
A response to the data transmission is needed with short delay.
The data needing to be transmitted with a low probability of missed reception.
A low probability of false alarm reception associated with the data transmission is desirable.

The method may, in some embodiments, further comprise (after transmitting the random access message to the network node on the second random access channel) obtaining the first synchronization accuracy vis-à-vis the network node and receiving a random access response from the network node.

A third aspect is a computer program product comprising a computer readable medium, having thereon a computer program comprising program instructions. The computer program is loadable into a data-processing unit and adapted to cause execution of the method according to any of the first and second aspect when the computer program is run by the data-processing unit.

According to a fourth aspect an arrangement is provided for a network node of a wireless communication system.

The arrangement comprises a random access configuration unit adapted to configure a first random access channel for transmission of random access messages from a first wireless communication device having a first synchronization accuracy vis-à-vis the network node and a second random access channel for transmission of random access messages from a second wireless communication device having a second synchronization accuracy vis-à-vis the network node, wherein the second synchronization accuracy is lower than the first synchronization accuracy.

The arrangement also comprises a transmitter adapted to transmit configuration information of at least the second random access channel to the first wireless communication device and to the second wireless communication device.

In some embodiments, the transmitter may be further adapted to transmit configuration information of the first random access channel to the first wireless communication device and to the second wireless communication device.

According to some embodiments, the arrangement may further comprise a random access monitor adapted to monitor the second random access channel, and a synchronization error determiner adapted to determine a synchronization error of the second wireless communication device if a random access message transmitted from the second wireless communication device is detected on the second random access channel.

The transmitter may be further adapted to transmit a random access response to the second wireless communication device.

The transmission of the random access response to the second wireless communication device may be compensated based on the determined synchronization error.

A fifth aspect is a network node of a wireless communication system comprising the arrangement according to the fourth aspect.

According to a sixth aspect, an arrangement is provided for a wireless communication device, wherein a first random access channel is for transmission of random access messages from the wireless communication device when it has a first synchronization accuracy vis-à-vis the network node and a second random access channel is for transmission of random access messages from the wireless communication device when it has a second synchronization accuracy vis-à-vis the network node. The second synchronization accuracy is lower than the first synchronization accuracy.

The arrangement comprises a receiver adapted to receive configuration information of at least the second random access channel from a network node of a wireless communication system.

In some embodiments, the receiver may be further adapted to receive configuration information of the first random access channel from the network node.

The arrangement may, according to some embodiments, further comprise a determiner adapted to determine (when a random access message is to be transmitted due to pending data) whether or not the pending data is to be transmitted under requirements that are associated with the second random access channel, and a transmitter adapted to (if it is determined that the pending data is to be transmitted under requirements that are associated with the second random access channel) transmit the random access message to the network node on the second random access channel.

In some embodiments, the arrangement may further comprise a synchronizer adapted to (after transmitting the random access message to the network node on the second random access channel) obtain the first synchronization accuracy vis-à-vis the network node after transmission by the transmitter of the random access message to the network node on the second random access channel.

The receiver may be further adapted to receive a random access response from the network node according to some embodiments.

A seventh aspect is a wireless communication device comprising the arrangement according to the sixth aspect.

An eighth aspect is an arrangement comprising a processor, wherein the processor is specifically adapted to carry out (or cause execution of) method steps of the method according to any of the first and second aspect. A ninth aspect and a tenth aspect are a network node and a wireless communication device, respectively, comprising the corresponding arrangement of the eight aspect.

In some embodiments, the third, fourth, fifth, sixth, seventh, eighth, ninth and tenth aspects may additionally have features identical with or corresponding to any of the various features as explained above for the first and second aspect, respectively. Similarly, the second aspect may additionally have features identical with or corresponding to any of the various features as explained above for the first aspect, and vice versa.

An advantage of some embodiments is that random access may be used without having to achieve system default synchronization accuracy vis-à-vis the network node.

Another advantage of some embodiments is that application of the random access procedure requires very low power consumption.

Yet another advantage of some embodiments is random access with low latency may be achieved.

Still another advantage of some embodiments is that a resource efficient and reliable way to accommodate time critical communication and regular communication within the same system.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
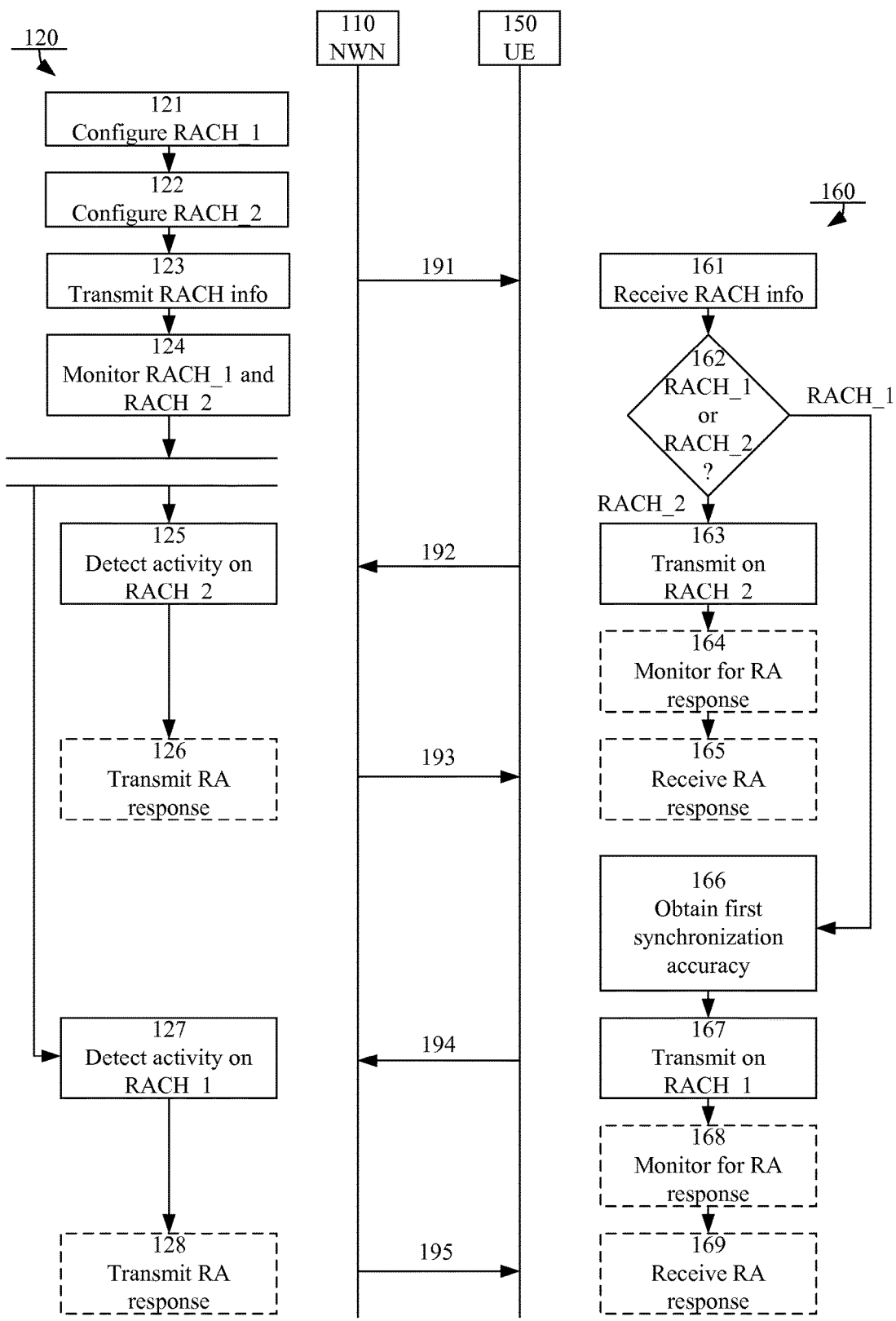
FIG. 1 is a combined flowchart and signaling diagram illustrating example method steps and signaling according to some embodiments.

In the following, embodiments will be described where a network node of a wireless communication system configures at least a first random access channel and second random access channel. The first and second random access channels are for transmission of random access messages from wireless communication devices operating in association with the wireless communication system.

The first random access channel is for use by one or more wireless communication devices having a first synchronization accuracy vis-à-vis the network node and the second random access channel is for use by one or more wireless communication devices having a second synchronization accuracy vis-à-vis the network node, wherein the second synchronization accuracy is lower than the first synchronization accuracy.

Typically, the first synchronization accuracy would be a "normal" synchronization accuracy, i.e. an accuracy that a wireless communication device is required to achieve before sending a random access request message over the first (also typically "normal") random access channel according to a typical scenario of the standard applied by the wireless communication system.

The second random access channel may typically be configured for wireless communication devices with low power requirements and/or low latency requirements (e.g. to achieve one or more of the advantages described above).

Typically, a wireless communication device with low power requirements may not be continuously synchronized to the network node. Thus, when a transmission is to be made, the wireless communication device first needs to acquire the appropriate synchronization before it may transmit its message using the first random access channel, which may substantially delay the transmission. Such delay may be violating a low latency requirement of the transmission (e.g. for Critical-MTC having an ultra-low delay criterion).

Therefore, the random access procedure typically used by the wireless communication device for initial access to the network node needs to be designed such that low latency transmissions by low power devices (e.g. rare alarm events) may be transmitted with high reliability. The second random access channel (requiring a lower than normal synchronization vis-à-vis the network node) represents such a random access procedure design.

Thus, a wireless communication system may be configured with two types of random access channels.

The first random access channel type may be in accordance with "normal" random access approaches (with a preconfigured random access time/frequency resource which cannot be used without proper time-frequency synchronization). Typically, the wireless communication device needs to be synchronized with at least the downlink of the serving/camping cell provided by the network node to use the first random access channel.

The second random access channel type may be designed for time-critical applications (alarms, etc.) where latency needs to be as low as possible. The second random access channel type may allow transmission (e.g. a RA preamble) by the wireless communication device even if it is not time-frequency synchronized with the network node to the extent required for "normal" random access approaches.

The second random access channel may, for example, be configured to be transmitted on a separate frequency resource within the total system bandwidth only allocated for such time critical random access.

Alternatively or additionally, the second random access channel may, for example, be configured to be of code-spreading type (spread over the total system bandwidth or large subset thereof).

FIG. 1 illustrates example method steps and signaling, according to some embodiments, between a network node (NWN) 110 a wireless communication system executing a method 120 and a wireless communication device (UE) 150 executing a method 160.

In step 121, the network node configures a first random access channel (RACH_1), which is for transmission of random access messages from a wireless communication device having a first synchronization accuracy vis-à-vis the network node.

In step 122, the network node configures a second random access channel (RACH_2), which is for transmission of random access messages from a wireless communication device having a second (lower than the first) synchronization accuracy vis-à-vis the network node.

In some embodiments, the configuration (steps 121 and 122) may be done during an admission control phase when the wireless communication device 150 detects the network node 110 and joins the wireless communication network.

The network node 110 transmits configuration information (RACH info) 191 to the wireless communication device 150 (and possibly also to other wireless communication devices) in step 123, and the configuration information (RACH info) 191 is received by the wireless communication device in step 161. For example, the transmission of the configuration information may be over a broadcast channel.

The configuration information comprises at least information regarding the second random access channel configuration. The configuration information may also comprise information regarding the first random access channel configuration. Different or the same configuration information may be sent to other wireless communication devices.

After having transmitted the configuration information 191, the network node monitors the configured random access channels (at least RACH_2, but typically both RACH_1 and RACH_2) as illustrated in step 124.

Monitoring the configured second random access channel may, for example, comprise searching for signal signatures specified for the second random access channel. Such signal signatures are typically configured (and thereby known) by the network node and, hence, matched filter techniques may be used for detection of the signal signatures.

The signal signature may, for example, be code-spreading signals. Alternatively or additionally, other suitable transmission techniques may be envisioned.

In some embodiments, the signal signature search of step 124 may be performed over a frequency grid (e.g. nominal carrier frequency $f_0 \pm 10 \cdot n$ kHz, n=1, 2, 3, . . . ). This may be beneficial since the wireless communication device may typically transmit the RACH_2 signature without (or very scarce) frequency synchronization. For example, the wireless communication device may base its RACH_2 transmission frequency on the accuracy of its (low power, low cost) crystal oscillator (typically with a worst case accuracy around 10 ppm).

If/when the wireless communication device has pending data to transmit to the network node (which requires a random access message to be sent—either to carry the data itself or to set up a connection for conveying the data), the wireless communication device determines (in step 162) whether to use the first (RACH_1) or second (RACH_2) random access channel.

The determination of step 162 may comprise considering under which requirements the data are to be transmitted. For example, RACH_2 may be used if one or more of the following requirements are fulfilled:

The data is of a type requiring low latency. This requirement may, for example, be defined via a latency threshold specifying that latencies below the threshold are low latencies. Alternatively or additionally, the requirement may be defined by assigning a latency classification to the data.

The data is of a type requiring a quick response (low response time) from the network node. This requirement may, for example, be defined via a response time threshold specifying that response times below the threshold are low response times.

The data is of a high priority (e.g. alarms). This requirement may be defined by assigning a priority classification to the data.

The data is to be sent with a low probability of missed reception. This requirement may, for example, be defined via a probability of missed reception threshold specifying that probabilities below the threshold are low probabilities of missed reception.

The data is to be sent with a low probability of false alarm. This requirement may, for example, be defined via a probability of false alarm threshold specifying that probabilities below the threshold are low probabilities of false alarm.

Alternatively or additionally, the determination of step 162 may depend on the radio bearer the data is to be transmitted over (e.g. a different radio bearer configured for different random access channels). Yet alternatively or additionally, the determination of step 162 may be based on a message size. For example, a message threshold may be configured by the network or may be fixed in a standard, wherein the threshold determines if the first or second random access channel should be used.

In some embodiments, a wireless communication device bases the determination in step 162 on an elapsed time since the wireless communication device was last synchronized (e.g. related to a requirement on maximum drift of the oscillator). For example, the wireless communication device may determine to use RACH_1 if the maximum drift of a clock driven by the oscillator is less than a (e.g. predefined) time interval (e.g. the slot time). A network node detecting activity on RACH_2 (step 125, which will be described in the following) may utilize knowledge regarding how long the wireless communication device has been inactive (which implies a minimum drift at the wireless communication device) to improve the accuracy (e.g. compensate a random access response transmission).

If it is determined that the second random access channel is to be used (RACH_2 path out from step 162), the wireless communication device transmits (in step 163) a random access message 192 to the network node on the second random access channel (RACH_2).

The random access message transmitted using the second random access channel (RACH_2) may, for example, comprise a preamble with a sequence associated with the wireless communication device (e.g. sensor ID). Alternatively or additionally, the message may comprise a message field (e.g. following the preamble). The message field may be indicative of information related to a time-critical event triggering the network node access (RA) attempt.

The network node detects the activity (transmission of the random access message 192) on the monitored RACH_2 in step 125 and transmits a random access (RA) response 193 in step 126 (if a random access response (RAR) is to be transmitted for the particular random access message 192).

In some embodiments, time/frequency configured RAR resources (synchronized, e.g. with the DL reference clock) may be used in step 126.

Alternatively or additionally, non-time aligned resources may be used in step 126 (e.g. using a pre-configured frequency or code-spread over the entire (or most of) the DL system bandwidth). This approach may, for example, be applicable if the response latency should be minimized. When non-time aligned resources are used, the timing and the carrier frequency used may, for example, be relative to the timing and detected frequency of the second random access channel detection (e.g. a detected RACH_2 signature).

After the wireless communication device has transmitted the random access message 192 to the network node on the second random access channel (in step 163), the wireless communication device may monitor for a random access (RA) response in step 164 (if a random access response is to be transmitted for the particular random access message 192) and receive such a response 193 in step 165.

If, on the other hand, it is determined that the first random access channel is to be used (RACH_1 path out from step 162), the wireless communication device makes sure it obtains the first synchronization accuracy vis-à-vis the network node in step 166 before transmitting (in step 167) the random access message 194 to the network node on the first random access channel (RACH_1).

The network node detects the activity (transmission of the random access message 194) on the monitored RACH_1 in step 127 and transmits a random access (RA) response 195 in step 128 (if a random access response is to be transmitted for the particular random access message 194, compare with step 126).

After the wireless communication device has transmitted the random access message 194 to the network node on the first random access channel (in step 167), the wireless communication device may monitor for a random access (RA) response in step 168 (if a random access response is to be transmitted for the particular random access message 194) and receive such a response 195 in step 169.

In some embodiments, the RA detection (steps 125 and 127) may imply other actions to be made by the network node (not shown in FIG. 1). The other actions may, for example, be related to a received RA sequence identity (ID), which may define which wireless communication device (e.g. sensor) sent the random access message (e.g. an alarm). The other actions may, for example, comprise one or more of performing an immediate stopping of a function or process associated with the network node, and immediately transmitting a report with high priority to another node (e.g. a server) associated with the network node.

Figure 2:
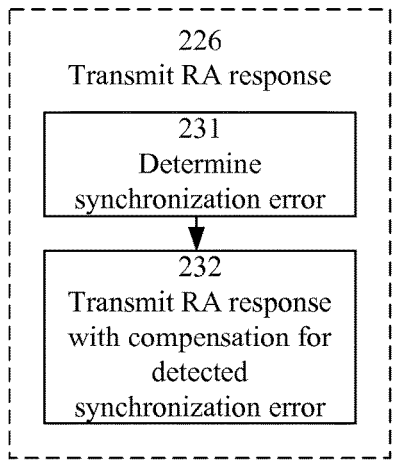
FIG. 2 is a flowchart illustrating example method steps according to some embodiments.

FIG. 2 illustrates an example method step 226 that may, for example, be implemented under step 126 of FIG. 1.

In this example, the network node (after having detected activity on the second random access channel) determines a synchronization error (e.g. a frequency error) of the wireless communication device in step 231 (for example based on a received random access message, compare with 192) and then, in step 232, adjusts transmission of a random access response (compare with 193) based on the determined synchronization error such that the transmission is compensated for the determined synchronization error.

Figure 3:
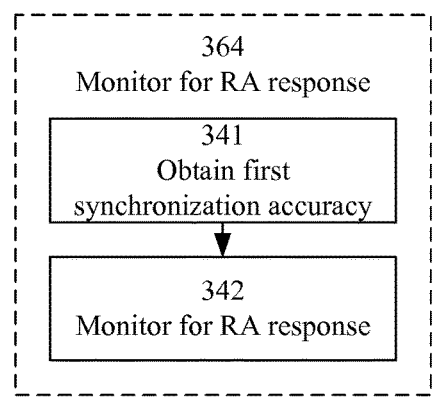
FIG. 3 is a flowchart illustrating example method steps according to some embodiments.

FIG. 3 illustrates an example method step 364 that may, for example, be implemented under step 164 of FIG. 1.

The method step 341 of FIG. 3 is particularly applicable if a random access response is expected or if more transmissions (apart from a random access message already transmitted using RACH_2) are expected to be done in the near future.

In this example, the wireless communication device (after having transmitted a random access message on the second random access channel) obtains the first synchronization accuracy vis-à-vis the network node in step 341 and then, in step 342, monitors for a random access response based on the first synchronization accuracy.

In some embodiments, step 341 may be performed in parallel to step 163 of FIG. 1.

It should be noted that the process described in connection to FIG. 3 differs from the "normal" synchronization procedure at least in that the first synchronization accuracy is only obtained after the random access message has been transmitted (using RACH_2).

Typically, the examples of FIGS. 2 and 3 are not implemented together. That is, either the random access response is compensated by the network node as illustrated by FIG. 2 or the wireless communication device obtains the higher synchronization accuracy before receipt of the random access response as illustrated by FIG. 3. However, combinations are not excluded.

Figure 4:
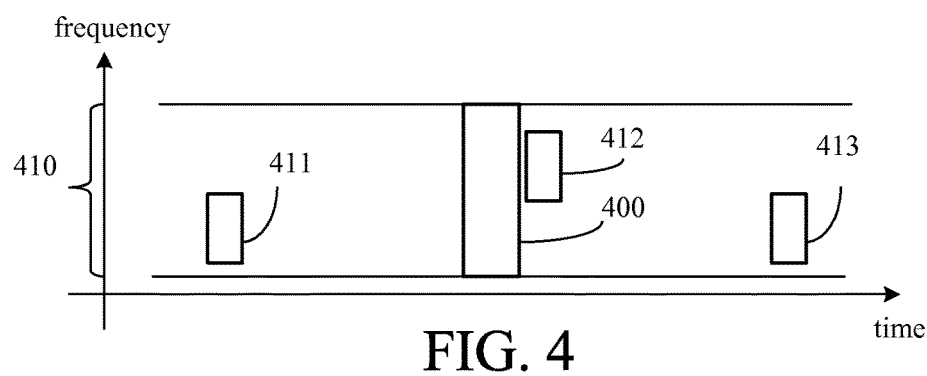
FIG. 4 is a schematic drawing illustrating example resource use according to some embodiments.
Figure 5:
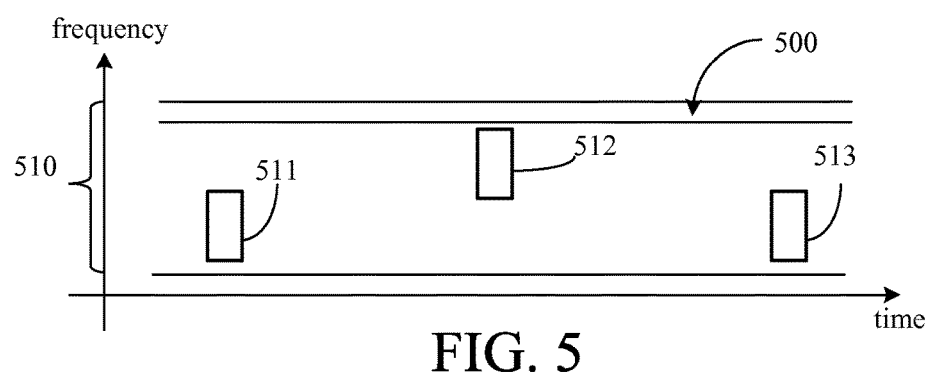
FIG. 5 is a schematic drawing illustrating example resource use according to some embodiments.

FIGS. 4 and 5 illustrate example resource use in relation to the first and second random access channels (RACH_1 and RACH_2) according to some embodiments. The principles of FIGS. 4 and 5 may, for example, be applied together with any of the methods as described in connection to FIGS. 1-3.

In existing random access approaches (e.g. in accordance with the Third Generation Partnership Project—3GPP—specifications for UMTS—Universal Mobile Telecommunication Standard—and UMTS LTE—Long Term Evolution) the random access (first random access channel, RACH_1) is allocated in dedicated time/frequency resources as schematically illustrated by 411, 412, 413, 511, 512, 513.

In addition to having to obtain certain synchronization accuracy before being able to use the first random access channel, the wireless communication device also needs to wait for the time instant of the allocated time/frequency resource before being able to transmit its random access message. This waiting time may introduce additional latency.

In some embodiments, the second random access channel comprises a time resource (typically over a part of or over the entire system bandwidth 410), which is illustrated by 400 of FIG. 4. In this case, the time and/or frequency synchronization required to use the second random access channel are typically not very precise.

The time resource may be dedicated specifically to the second random access channel or may be shared with other communication of the wireless communication system.

In some embodiments, the second random access channel comprises a frequency resource (typically a part of the system bandwidth 510), which is illustrated by 500 of FIG. 5. In this case, there are no time restrictions to using the second random access channel. A random access message may be transmitted at any time, which provides for a low latency.

The frequency resource may be dedicated specifically to the second random access channel or may be shared with other communication of the wireless communication system.

In the embodiments where the time and/or frequency resource of the second random access channel is shared with other communication of the wireless communication system, the second random access channel may also comprise a spreading code dedicated specifically to the second random access channel. This provides for low interference between the second random access channel and the other communication of the wireless communication system.

The network may, for example, assign a different spreading code to each wireless communication device to be used for crucial communication (e.g. alarm signals). Potentially this can be a different interleaver in case of IDMA (interleave division multiple access) where the same spreading code is used by all devices and only the interleaver is used to differentiate between them.

Another (shared) spreading code (or interleaver) may be used by all devices for regular traffic which is scheduled in advance by the network. Thus, if there are N devices there will be N+1 codes (or interleavers) in this example, and each device will have two spreading codes (or interleavers), one for crucial communication and one for regular traffic.

Typically, the second random access channel may be used without exact knowledge of the frequency and downlink timing of the network node. In one example, a frequency error of up to 10-20 ppm may be allowed (where 10-20 ppm is a typical worst case scenario for a low cost/low power (cold start, i.e. without any prior knowledge of NW node carrier frequency) crystal oscillator in typical wireless communication devices). In another example, frequency errors up to $10^{ths}$ of ppm may be tolerated (e.g. 10-30 kHz at 1-10 GHz carrier).

On the other hand, the first random access channel may typically not be used without exact knowledge of the frequency and downlink timing of the network node. In one example, a time synchronization level of microseconds and a frequency synchronization of $100^{ths}$ of Hz is required.

Figure 6:
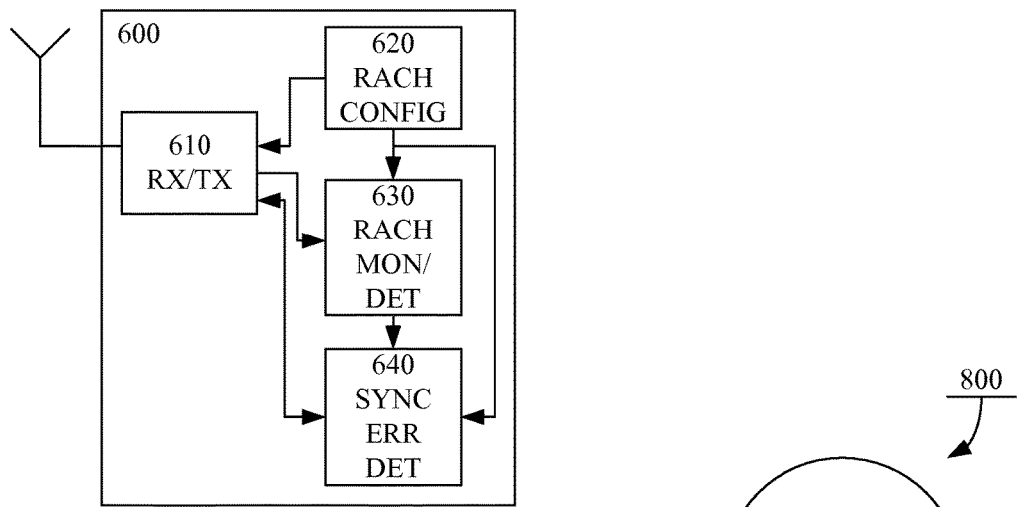
FIG. 6 is a block diagram illustrating an example arrangement according to some embodiments.

FIG. 6 illustrates an example arrangement 600 according to some embodiments. The arrangement 600 may, for example, be comprised in a network node of a wireless communication system (e.g. NWN 110 of FIG. 1). The arrangement 600 may, for example, be adapted to perform the method 120 of FIG. 1.

The arrangement 600 comprises a transceiver (RX/TX) 610, a random access configuration unit (RACH CONFIG) 620, a random access monitor (RACH MON/DET) 630 and a synchronization error determiner (SYNCH ERR DET) 640.

The random access configuration unit 620 is adapted to configure (compare with steps 121 and 122 of FIG. 1) a first random access channel for transmission of random access messages from a wireless communication device having a first synchronization accuracy vis-à-vis the network node and a second random access channel for transmission of random access messages from a wireless communication device having a second synchronization accuracy vis-à-vis the network node, wherein the second synchronization accuracy is lower than the first synchronization accuracy.

The transmitter of the transceiver 610 is adapted to transmit configuration information to one or more wireless communication devices (compare with step 123 of FIG. 1).

The random access monitor 630 is adapted to monitor the random access channels (compare with step 124 of FIG. 1) and to detect activity on the random access channels (compare with steps 125 and 127 of FIG. 1).

The synchronization error determiner 640 is adapted to determine a synchronization error of the second wireless communication device (compare with step 231 of FIG. 2).

The transmitter for the transceiver 610 is adapted to transmit a random access response to the second wireless communication device (compare with steps 126 and 128 of FIG. 1 and step 226 of FIG. 2). In some embodiments, the transmission is compensated based on the determined synchronization error of the synchronization error determiner 640 (compare with step 232 of FIG. 2).

Figure 7:
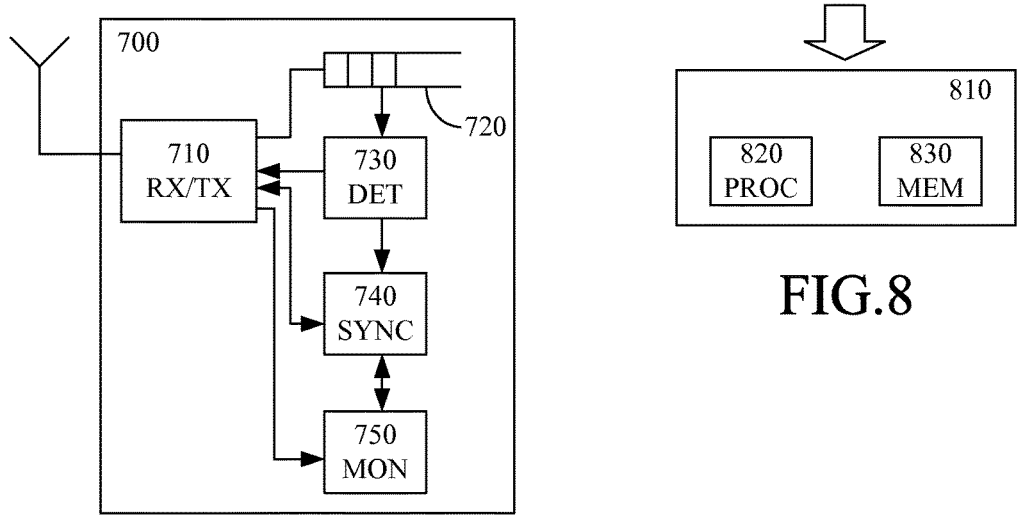
FIG. 7 is a block diagram illustrating an example arrangement according to some embodiments.

FIG. 7 illustrates an example arrangement 700 according to some embodiments. The arrangement 700 may, for example, be comprised in a wireless communication device (e.g. UE 150 of FIG. 1). The arrangement 700 may, for example, be adapted to perform the method 160 of FIG. 1.

The arrangement 700 comprises a transceiver (RX/TX) 710, a determiner (DET) 730, a transmission buffer 720, a synchronizer (SYNC) 740 and a monitor (MON) 750.

The receiver of the transceiver 710 is adapted to receive configuration information of at least a second random access channel (and possibly also of a first random access channel) from a network node of a wireless communication system (compare with step 161 of FIG. 1).

The determiner 730 is adapted to determine, when a random access message is to be transmitted due to pending data in the transmission buffer 720, whether or not the pending data is to be transmitted under requirements that are associated with the second random access channel (compare with step 162 of FIG. 1).

The transmitter of the transceiver 710 is adapted to transmit random access messages to the network node on the first or second random access channel, as determined by the determiner 730 (compare with steps 163 and 167 of FIG. 1).

The monitor 750 is adapted to monitor for a random access response (compare with steps 164 and 168 of FIG. 1 and steps 364 and 342 of FIG. 3), and the receiver of the transceiver 710 is adapted to receive such a response (compare with steps 165 and 169 of FIG. 1).

The synchronizer 740 is adapted to (after a random access message has been transmitted on the second random access channel) obtain the first synchronization accuracy vis-à-vis the network node (compare with step 341 of FIG. 3).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments.

Figure 8:
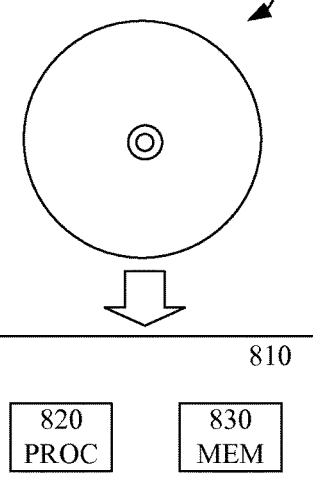
FIG. 8 is a schematic drawing illustrating a computer program product according to some embodiments.

According to some embodiments, a computer program product comprises a computer readable medium such as, for example, a diskette or a CD-ROM as illustrated by 800 of FIG. 8. The computer readable medium 800 may have stored thereon a computer program comprising program instructions. The computer program may be loadable into a data-processing unit (PROC) 820, which may, for example, be comprised in a wireless communication device or network node 810. When loaded into the data-processing unit, the computer program may be stored in a memory (MEM) 830 associated with or integral to the data-processing unit. According to some embodiments, the computer program may, when loaded into and run by the data-processing unit, cause the data-processing unit to execute method steps according to, for example, the methods shown in any of the FIGS. 1, 2, and 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a network node of a wireless communication system, the method comprising:
   configuring a first random access channel for transmission of random access messages from a first wireless communication device having a first synchronization accuracy vis-à-vis the network node;
   configuring a second random access channel for transmission of random access messages from a second wireless communication device having a second synchronization accuracy vis-à-vis the network node, wherein the second synchronization accuracy is less accurate than the first synchronization accuracy;
   transmitting configuration information of at least the second random access channel to the first wireless communication device and to the second wireless communication device;
   monitoring the second random access channel; and
   in response to detecting a random access message transmitted from the second wireless communication device on the second random access channel, determining a synchronization error of the second wireless communication device and transmitting a random access response to the second wireless communication device, wherein the transmission is compensated based on the determined synchronization error.

2. The method of claim 1, further comprising transmitting configuration information of the first random access channel to the first wireless communication device and to the second wireless communication device.

3. The method of claim 1, wherein the second random access channel comprises a frequency resource dedicated specifically to the second random access channel.

4. The method of claim 1, wherein the second random access channel comprises a frequency resource shared with other communication of the wireless communication system.

5. The method of claim 4, wherein the second random access channel further comprises a spreading code dedicated specifically to the second random access channel.

6. A method, in a wireless communication device wherein a first random access channel is for transmission of random access messages from the wireless communication device when it has a first synchronization accuracy vis-à-vis the network node and a second random access channel is for transmission of random access messages from the wireless communication device when it has a second synchronization accuracy vis-à-vis the network node, wherein the second synchronization accuracy is less accurate than the first synchronization accuracy, the method comprising:
   receiving configuration information of at least the second random access channel from a network node of a wireless communication system; and
   responsive to determining that a random access message is to be transmitted due to pending data, determining whether the pending data is to be transmitted under requirements that are associated with the second random access channel and, responsive to determining that the pending data is to be transmitted under requirements that are associated with the second random access channel, transmitting the random access message to the network node on the second random access channel.

7. The method of claim 6, further comprising receiving configuration information of the first random access channel from the network node.

8. The method of claim 6, further comprising, after transmitting the random access message to the network node on the second random access channel:
   obtaining the first synchronization accuracy vis-à-vis the network node; and
   receiving a random access response from the network node.

9. An arrangement for a network node of a wireless communication system, the arrangement comprising:
   a processing circuit configured to:
      configure a first random access channel for transmission of random access messages from a first wireless communication device having a first synchronization accuracy vis-à-vis the network node; and
      configure a second random access channel for transmission of random access messages from a second wireless communication device having a second synchronization accuracy vis-à-vis the network node, wherein the second synchronization accuracy is less accurate than the first synchronization accuracy; and
   a transmitter configured to transmit configuration information of at least the second random access channel to the first wireless communication device and to the second wireless communication device;
   wherein the processing circuit is further configured to:
      monitor the second random access channel; and
      in response to detecting a random access message transmitted from the second wireless communication device on the second random access channel, determine a synchronization error of the second wireless communication device and transmit a random access response to the second wireless communication device, using the transmitter, wherein the transmission is compensated based on the determined synchronization error.

10. The arrangement of claim 9, wherein the transmitter is further configured to transmit configuration information of the first random access channel to the first wireless communication device and to the second wireless communication device.

11. The arrangement of claim 9, wherein the second random access channel comprises a frequency resource dedicated specifically to the second random access channel.

12. The arrangement of claim 9, wherein the second random access channel comprises a frequency resource shared with other communication of the wireless communication system.

13. The arrangement of claim 12, wherein the second random access channel further comprises a spreading code dedicated specifically to the second random access channel.

14. A network node of a wireless communication system, the network node comprising the arrangement of claim 9.

15. An arrangement for a wireless communication device, wherein a first random access channel is for transmission of random access messages from the wireless communication device when it has a first synchronization accuracy vis-à-vis the network node and a second random access channel is for transmission of random access messages from the wireless communication device when it has a second synchronization accuracy vis-à-vis the network node, wherein the second synchronization accuracy is less accurate than the first synchronization accuracy, the arrangement comprising:
- a receiver adapted to receive configuration information of at least the second random access channel from a network node of a wireless communication system;
- a transmitter; and
- a processing circuit operatively coupled to the receiver and the transmitter and configured to, responsive to determining that a random access message is to be transmitted due to pending data, determine whether the pending data is to be transmitted under requirements that are associated with the second random access channel and, responsive to determining that the pending data is to be transmitted under requirements that are associated with the second random access channel, transmit the random access message to the network node on the second random access channel.

16. The arrangement of claim 15, wherein the receiver is further adapted to receive configuration information of the first random access channel from the network node.

17. The arrangement of claim 15, wherein:
- the processing circuit is configured to obtain the first synchronization accuracy vis-à-vis the network node after transmission by the transmitter of the random access message to the network node on the second random access channel, and
- wherein the receiver is further configured to receive a random access response from the network node.

18. A wireless communication device comprising the arrangement of claim 15.

\* \* \* \* \*